United States Patent [19]
Nikaido et al.

[11] 3,731,125
[45] May 1, 1973

[54] PULSE MOTOR FOR TIME PIECE

[75] Inventors: Akira Nikaido, Fuchu; Mitsuo Onda, Omiya; Fumio Nakajima; Terutaka Okano, both of Tokyo; Takayasu Machida, Iruma; Takashi Toida; Yoshihiko Yanagawa, both of Tokyo, all of Japan

[73] Assignee: Citizen Watch Co., Ltd., Tokyo, Japan

[22] Filed: June 10, 1971

[21] Appl. No.: 151,865

[30] Foreign Application Priority Data

June 13, 1970 Japan ..................... 45/59037
Sept. 14, 1970 Japan ..................... 45/91383

[52] U.S. Cl. ............... 310/49, 310/40 MM, 310/41, 310/156
[51] Int. Cl. .......................................... H02k 37/00
[58] Field of Search ............... 310/70, 40, 40 MM, 310/66, 156, 49, 162, 41, 163, 164, 172; 58/23, 23 D

[56] References Cited

UNITED STATES PATENTS 3,413,501  11/1968  Dotto ................................. 310/172
3,447,008  5/1969   Regner ............................... 310/164
3,597,915  8/1971   Aizawa ............................... 58/23 D
2,433,608  12/1947  Handley ............................. 58/23 D
2,624,017  12/1952  Putnocky ............................ 58/23 D
3,525,888  8/1970   Linn .................................. 310/41

Primary Examiner—R. Skudy
Attorney—William D. Hall, Elliott I. Pollock, Fred C. Philpitt, George Vande Sande, Charles F. Steininger and Robert R. Priddy

[57] ABSTRACT

A pulse motor for use in time pieces comprises a stator which defines a circular space, and a circular rotor provided with a plurality of equally spaced slots extending inwardly from the periphery of the rotor at an angle to the radial direction. The rotor is concentrically disposed in said space so that a uniform annular interstice is formed between the stator and rotor. An index finger or pawl, provided for preventing backward motion of a ratchet wheel fixed to the shaft of the rotor, contacts only the tip portion of a tooth of the ratchet wheel.

3 Claims, 3 Drawing Figures

INVENTORS
A. NIKAIDO, M. ONDA, F. NAKAJIMA,
T. OKANO, T. MACHIDA, T. TOIDA,
Y. YANAGAWA

BY

ATTORNEY

PULSE MOTOR FOR TIME PIECE

BACKGROUND OF THE INVENTION

1. Field of the Invention

This invention relates to pulse motors for use in time pieces and more particularly to a pulse motor having a composite structure comprising a permanent magnet rotor mounted on a rotary shaft and a ratchet wheel fixedly mounted on the rotary shaft of the permanent magnet rotor for unitary rotation therewith.

2. Description of the Prior Art

In conventional pulse motors for use in time pieces such as, for example, master-slave clocks, it is known that either the rotor or stator must be shaped to be asymmetrical on opposite sides of the plane including the rotor axis so that the rotor can be rotated in a predetermined direction in response to the application of polarized pulses to the stator.

For example, in French Pat. No. 1,033,643 there is disclosed the technique that the magnetic neutral point is shifted by eccentrically shaping the stator of a pulse motor to vary the gap between the stator and the rotor along the magnetic poles, thereby stopping the rotor at a position at which the center lines of the opposite poles of the stator and the rotor are offset from each other, to determine the direction or sense of the start of the pulse motor.

Further, according to a known arrangement for fixing the phase of the rotor in pulse motors for use in time pieces, a resilient member is brought into pressure engagement with the tooth of the gear driven by the rotor for preventing the gear from accidental rotation. According to another known arrangement, a reverse rotation preventive pinion is mounted on the rotary shaft of the rotor and is engaged by a resilient member so that it acts to prevent the reverse rotation of the rotor. The described arrangement employing an asymmetrical stator is defective in that an asymmetrical air gap is formed between the rotor and the stator, and the magnetomotive force is reduced in portions where the magnetic reluctance of the air gap is large, resulting in a reduction in the electro-mechanical energy conversion efficiency. The arrangement employing an asymmetrical permanent magnet rotor interposed between an upper and a lower yoke portion is also defective in that the pulse motor is complex in structure and the inertia and mass are increased beyond an allowable limit with the result that the desired pulse responsive function may be lost. The arrangement employing a resilient member in pressure engagement with the tooth of the gear driven by the rotor is also defective in that the load and power consumption are necessarily increased during starting due to the force imparted by the resilient member, and the rotor is difficult to set at a proper phase due to the backlash between the rotor pinion and the gear driven by the rotor. The arrangement in which the reverse rotation preventive means or gear is provided in coaxial relation with the rotor and is engaged by the resilient member for preventing reverse rotation of the rotor is also defective in that it cannot be used in a miniature pulse motor of low power consumption for use in crystal wrist watches due to the increase in the dead weight.

SUMMARY OF THE INVENTION

It is an object of the present invention to provide a miniature pulse motor which is free from the defects above described and which can be satisfactorily used in electric watches, especially in quartz crystal wrist watches.

Another object of the present invention is to provide a pulse motor having a ratchet means capable of fixing the phase of the rotor at a low loss.

In accordance with the present invention, there is provided a pulse motor comprising a rotor having a plurality of magnetic poles defined by a plurality of spaced slots extending inwardly from the outer periphery of said rotor between the magnetic poles at a suitable angle with respect to the diameter of said rotor, a ratchet wheel fixedly mounted on the rotary shaft of said rotor and having such a number of teeth which is equal to the number of the magnetic poles of said rotor, and a holding spring engaging the tip of one tooth of said ratchet wheel.

DESCRIPTION OF THE PREFERRED EMBODIMENT

Figure 1:
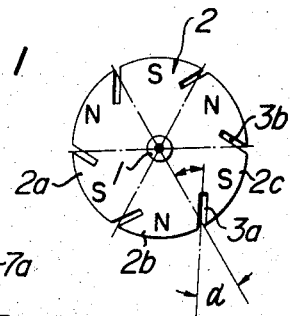
FIG. 1 is a schematic plan view showing the structure of a permanent magnet rotor preferably used in a pulse motor embodying the present invention.

Referring to FIG. 1, a circularly symmetric permanent magnet rotor 2 is mounted on a rotary shaft 1 and is made effectively asymmetric by a plurality of slots $3a$, $3b$, $3c$, . . . which extend inwardly from the outer periphery at an angle $\alpha$ with respect to the diameter. The angle $\alpha$ in the embodiment is preferably 15°. The slots $3a$, $3b$, $3c$, . . . define a plurality of magnetic poles $2a$, $2b$, $2c$, . . . which are permanently magnetized.

Figure 2:
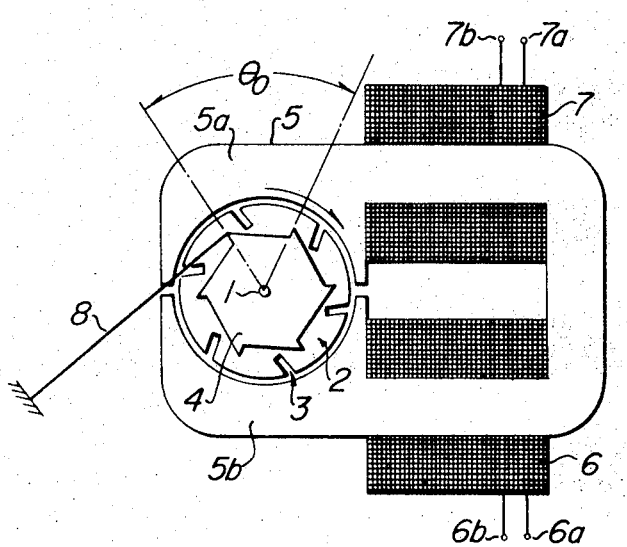
FIGS. 2 and 3 are schematic plan views showing the structure and operation of the pulse motor of the present invention.

Referring to FIG. 2, a ratchet wheel 4 is provided with a number of teeth equal to the number of magnetic poles of the rotor 2. The ratchet wheel 4 is fixedly mounted on the rotary shaft 1 for unitary rotation with the rotor 2, and a resilient member or ratchet spring 8 engages one of the teeth of the ratchet wheel 4 which is rotated in a direction shown by the arrow in unison with the rotor 2. Stator 5 comprises a yoke which defines a pair of poles $5a$, $5b$ separated from one another by a circularly symmetric space; and rotor 2, which has a diameter less than that of said space, is concentrically disposed in said space. The rotor 2 is magnetically coupled through an annular air gap having a uniform width corresponding to the difference in diameter of the circular rotor and circular space, to the opposite magnetic poles $5a$ and $5b$ of stator 5 which is symmetrical in shape relative to the rotary shaft 1 as shown. The ratchet spring 8 is anchored at one end to a portion of the pillar plate and is in light contact at the other end with the tooth of the ratchet wheel 4. Coils 6 and 7 having terminals $6a$, $6b$ and $7a$, $7b$ respectively are wound around the yoke of stator 5, and time-spaced polarized pulses are alternately applied to these coils 6 and 7 to magnetize stator poles $5a$ and $5b$ during successive spaced intervals of time thereby to effect a step-bycstep rotation of rotor 2.

In fixing the phase of the rotor 2, the ratchet spring 8 is disengaged from the ratchet wheel 4 so that the rotor 2 disposed opposite to the magnetic poles 5a and 5b of the stator 5 is biased in the direction of rotation from the position shown in FIG. 2 and finally stops at the proper phase.

In such an angular position of the rotor 2, the ratchet spring 8 is brought into engagement with a tooth of the ratchet wheel 4, and an input pulse voltage having a suitable pulse width is alternately applied across the terminals 6a, 6b and 7a, 7b to cause rotation of the rotor 2 in the direction of the arrow.

When a load is imparted to the pulse motor, the torque tends to bias the rotor 2 in a direction opposite to the direction shown by the arrow. However, due to the fact that the ratchet spring 8 acts to prevent any phase shift in the reverse direction, no phase shift occurs in the loaded rotor 2 and thus the starting characteristic is substantially the same as when the pulse motor is started from the no-load state.

Figure 3:
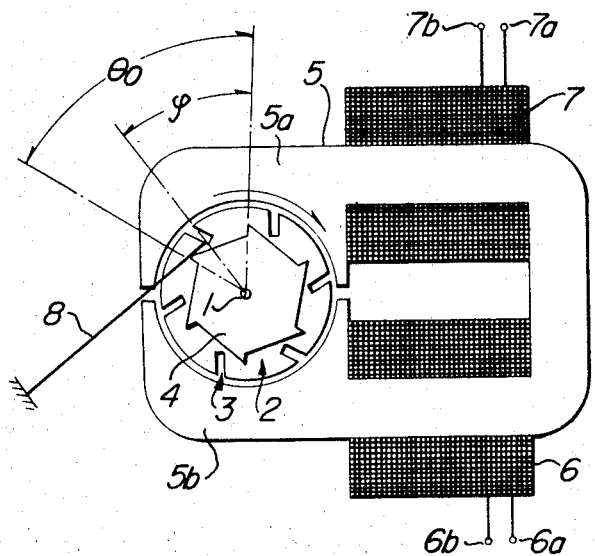

The face that the present invention provides a pulse motor of low loss will be explained with reference to FIGS. 2 and 3. The rotor 2 is rotated through an angle $\theta_o = 360°$ divided by the number of magnetic poles in response to one pulse. The ratchet spring 8 is not in contact with the next tooth of the ratchet wheel 4 within the range of an angle $\phi$ when the rotor 2 rotates in the direction of the arrow from the position shown in FIG. 2. The ratchet spring 8 is then brought into contact with the next tooth of the ratchet wheel 4 within the range of an angle $(\theta_o - \phi)$ which is very small as seen in FIG. 3. Referring to FIG. 2 again, the rotor 2 is ready to rotate in response to the application of a starting pulse. In response to the application of the pulse, the ratchet spring 8 is immediately disengaged from the tooth of the ratchet wheel 4 and is merely brought into contact with the next tooth within the very narrow range of the angle $(\theta_o - \phi)$ until the rotor 2 ceases to rotate. Therefore, the pulse motor can operate with low loss and low power consumption in spite of its very simple construction.

It will be understood from the foregoing description that the present invention provides an inexpensive pulse motor for use in time pieces, especially in quartz crystal wrist watches in which the adjustment of the phase is substantially unnecessary due to the fact that the phase can be properly fixed by the rotor itself. The present invention is further advantageous in that the pulse motor can stably operate without any phase shift in the loaded condition. Another advantage resides in the fact that the pulse motor can operate with low loss and low power consumption since the ratchet spring is immediately disengaged from the tooth of the ratchet wheel as soon as the rotor starts rotation. A pulse motor constructed according to the present invention could satisfactorily operate under the following conditions:

| | |
|---|---|
| Diameter of rotor | 3 mm |
| Number of poles | 6 |
| Diameter of stator coils | 20 $\mu$ |
| Number of turns | 20,000 |
| Input voltage | 1.5 volts |
| Width of polarized pulse | 1/64 period |
| Drive frequency | 1 Hz |
| Mean current consumption | 5.5 $\mu$A |

We claim:

1. A pulse motor for use in time pieces comprising a stator defining a pair of poles separated from one another by a circularly symmetric space, a permanent magnet rotor having a circularly symmetric periphery of smaller diameter than said space, said rotor being concentrically disposed in said circular space to form an annular interstice of uniform width between the periphery of said rotor and the stator poles, said circular rotor being rendered asymmetrical by a plurality of equally spaced, uniform width slots extending inwardly from the periphery of the rotor at an angle to the radial direction of said rotor to define a plurality of permanent magnetic poles of alternately opposing polarity between said slots in said rotor equal in number to the number of said slots, coil means on said stator, and means for applying time-spaced polarized pulses to said coil means to magnetize said stator poles during successive spaced intervals of time to effect a step-by-step rotation of said rotor.

2. A pulse motor according to claim 1, including a ratchet wheel fixed to the shaft of the rotor, and a pawl for preventing backward motion of said ratchet wheel, said pawl being positioned to contact only with the tip portion of a tooth of the ratchet wheel.

3. A pulse motor according to claim 1 wherein said slots define a total of six magnetic poles in said rotor, the angle between each of said slots and the radial direction of said rotor being about 15°.

* * * * *